(No Model.)

G. VÉCSEY & T. DAVIDSON.
FILTER.

No. 443,246. Patented Dec. 23, 1890.

Witnesses.
Chas. W. Cambridge,
B. W. Sommers

Inventor.
Gideon Vécsey
Thomas Davidson
by Henry Orth Atty.

UNITED STATES PATENT OFFICE.

GIDEON VÉCSEY AND THOMAS DAVIDSON, OF SYDNEY, NEW SOUTH WALES, ASSIGNORS TO SAID DAVIDSON AND EDWIN JOSIAH TOBIN, OF SAME PLACE.

FILTER.

SPECIFICATION forming part of Letters Patent No. 443,246, dated December 23, 1890.

Application filed August 16, 1890. Serial No. 362,182. (No model.)

*To all whom it may concern:*

Be it known that we, GIDEON VÉCSEY and THOMAS DAVIDSON, filter - manufacturers, both subjects of the Queen of Great Britain, residing at Darlinghurst, in the city of Sydney and British Colony of New South Wales, have invented new and useful Improvements in Filters and Filtering Apparatus, of which the following is a specification.

This invention relates more particularly to the domestic or household filter, although it is equally applicable to other kinds of filtering apparatus. It has been specially devised in order to provide increased effective capacity of filtering media with, if anything, a decrease of size of the same.

These improvements in filters and filtering apparatus consist, first, in the combination and arrangement with the respective reservoirs of unfiltered and filtered liquid of the filtering media constructed as hollow walls around an open space, the hollow of such walls being hermetically closed top and bottom, but communicating with the reservoir for filtered liquid, and, secondly, in the particular combination and arrangement of parts, hereinafter more particularly set forth.

In constructing a domestic filter according to this invention we divide a chamber into two parts by a disk or wall firmly cemented in, so that there shall be reservoirs for the unfiltered and filtered liquid, respectively, and this disk or wall we prefer should be composed of the filtering media, preferably limestone, and should have through it a communicating passage between the reservoirs. The filtering media we make by cutting a deep groove or annulus in the walls of a cylinder, also preferably of limestone, and firmly closing the ends of such groove or annulus. On the face or foot of this cylinder we fix a valve or cone with a port or passage to such annulus. Now, this hollow annulus is seated upon the dividing-plate in the chamber with its valve or cone taking into and forming a tight joint on a seating in the communicating-orifice on said division.

In constructing filtering apparatus according to this invention the filtering media having a hollow annulus or space between closed walls would be set inside the reservoir for unfiltered liquid and the filtered-liquid reservoir communicating with said hollow annulus or space would be set inside or outside of the first-mentioned reservoir.

In order that this invention may be clearly understood, reference will now be made to the drawings herewith, in which—

Figure 1:
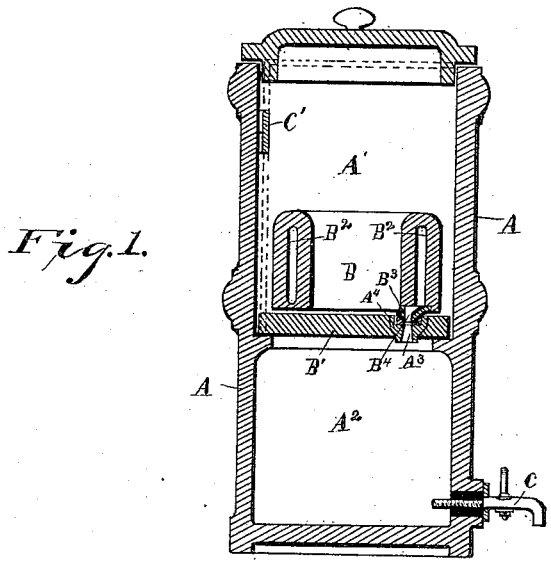
Figure 2:
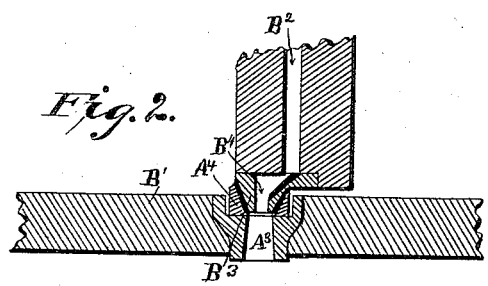
Figure 3:
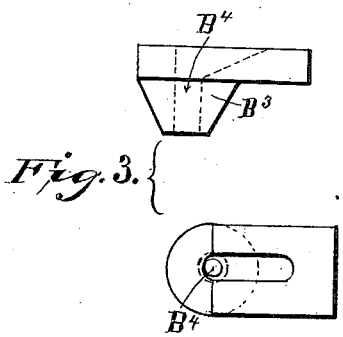
Figure 4:
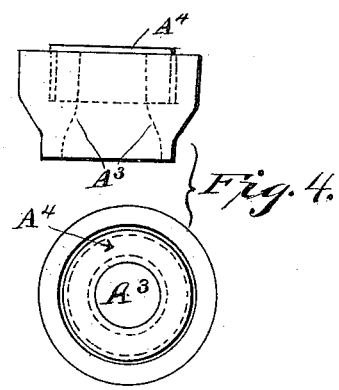

Figure 1 is a section of a filter constructed according to these improvements, and Figs. 2, 3, and 4 are enlarged details of parts of same.

A is the filter-body, B filtering cylinder or media, and C draw-off tap.

A' is the reservoir for unfiltered liquid, and A² the receiver for filtered liquid.

A³ is the orifice, and A⁴ the valve-seating of india-rubber.

B' is the porous dividing disk or wall; B², the annulus or groove; B³, the valve or cone, and B⁴ the port or passage.

C' is an air-pipe.

The filtering-cylinder B is placed upon the dividing-disk B' within chamber A', the valve or cone B³ resting upon and making a tight joint with the valve-seating A⁴. The chamber or reservoir A' is supplied with the water or liquid to be filtered, which liquid surrounds and filters through the exterior and interior walls of the cylinder B into the annulus or groove B², from whence it passes by port or passage B⁴ through valve B³ and orifice A³ into the chamber A², from whence it is drawn through cock or tap C.

A filtering apparatus constructed according to this invention does not need drawings to enable the same to be understood, for it would consist of a tank or reservoir for unfiltered liquid upon the bottom of which or level with the bottom of which is placed a filtering-cylinder B, having a port or passage B⁴, as illustrated in the drawings, but, instead of the valve or cone B³, having a screwed socket or other connection to which a pipe might be attached, said pipe having its own tap or discharging or communicating with a receiver or reservoir for filtered liquid having its own draw-off cock or tap and having the necessary air-escape pipe.

Having now particularly described and explained the nature of this said invention and the manner in which the same is to be performed, we declare that what we claim is—

1. A filter divided into two superposed chambers by a partition constructed of a filtering material, said partition being provided with a port or passage, of a hollow annulus constructed of a filtering material loosely seated on said partition and provided with a discharge-nozzle fitting fluid-tight into the port of the partition, as set forth.

2. A filter divided into two chambers by a partition constructed of filtering material, said partition being provided with a port, a bushing seated fluid-tight in said port and having substantially the form of a truncated cone, the passage through which is enlarged at one end, and a cylindrical packing-ring seated in said bushing, of a hollow annulus constructed of a filtering material and adapted to seat on the partition, and a discharge-nozzle for said annulus in communication with the interior thereof, said nozzle seating in the packing-ring, substantially as and for the purpose set forth.

G. VÉCSEY.
THOS. DAVIDSON.

Witnesses:
FRED WALSH,
    *F. M. Inst. P. A.*
THOMAS JAMES WARD,
    *Clerk to Edward Waters, Sydney.*